Aug. 5, 1969     I. Z. MARTIN     3,458,951
HYDROCULTURE GRASS UNIT

Filed March 31, 1967     5 Sheets-Sheet 1

INVENTOR.
Ivan Z. Martin
BY Karl L. Spivak
ATTORNEY

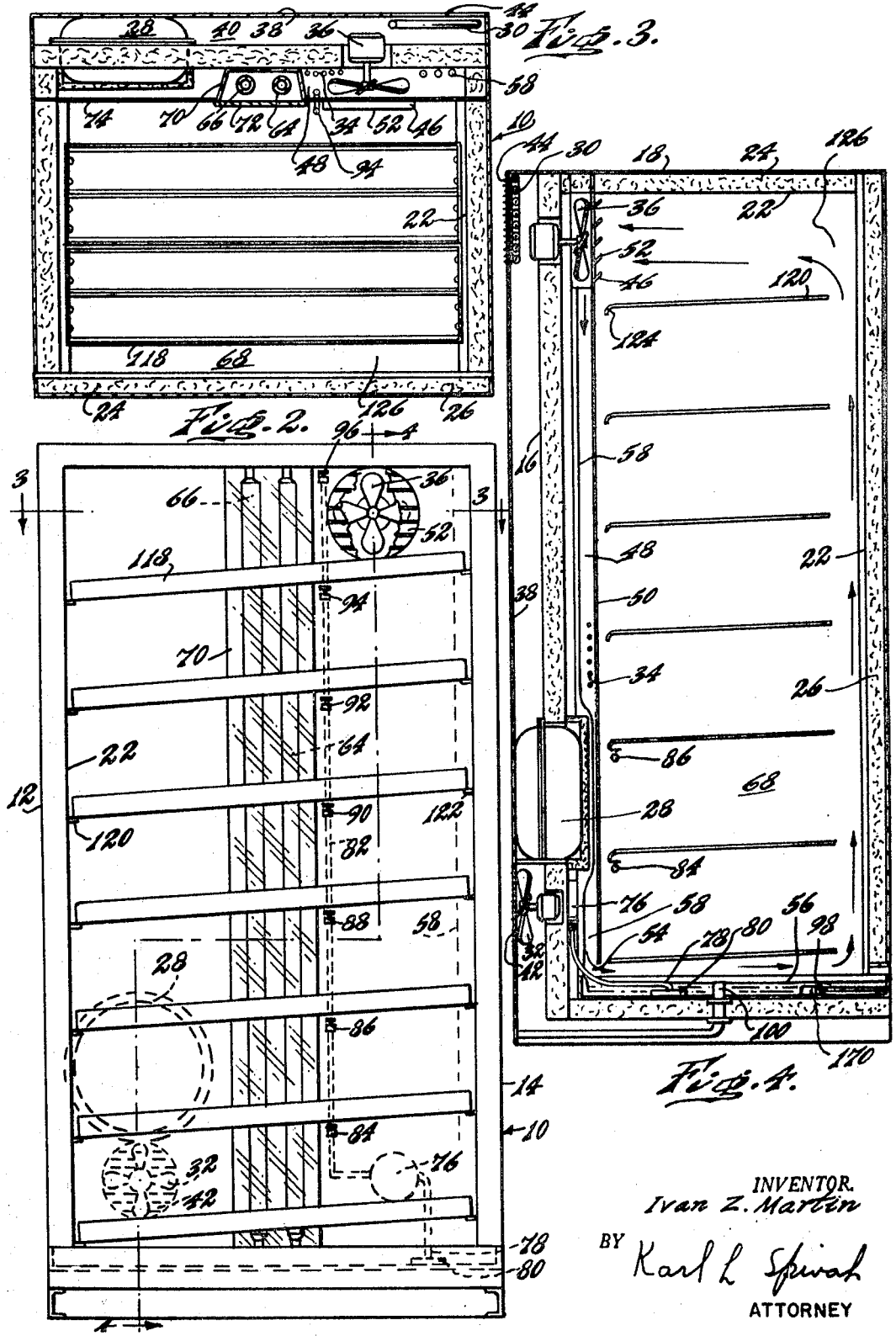

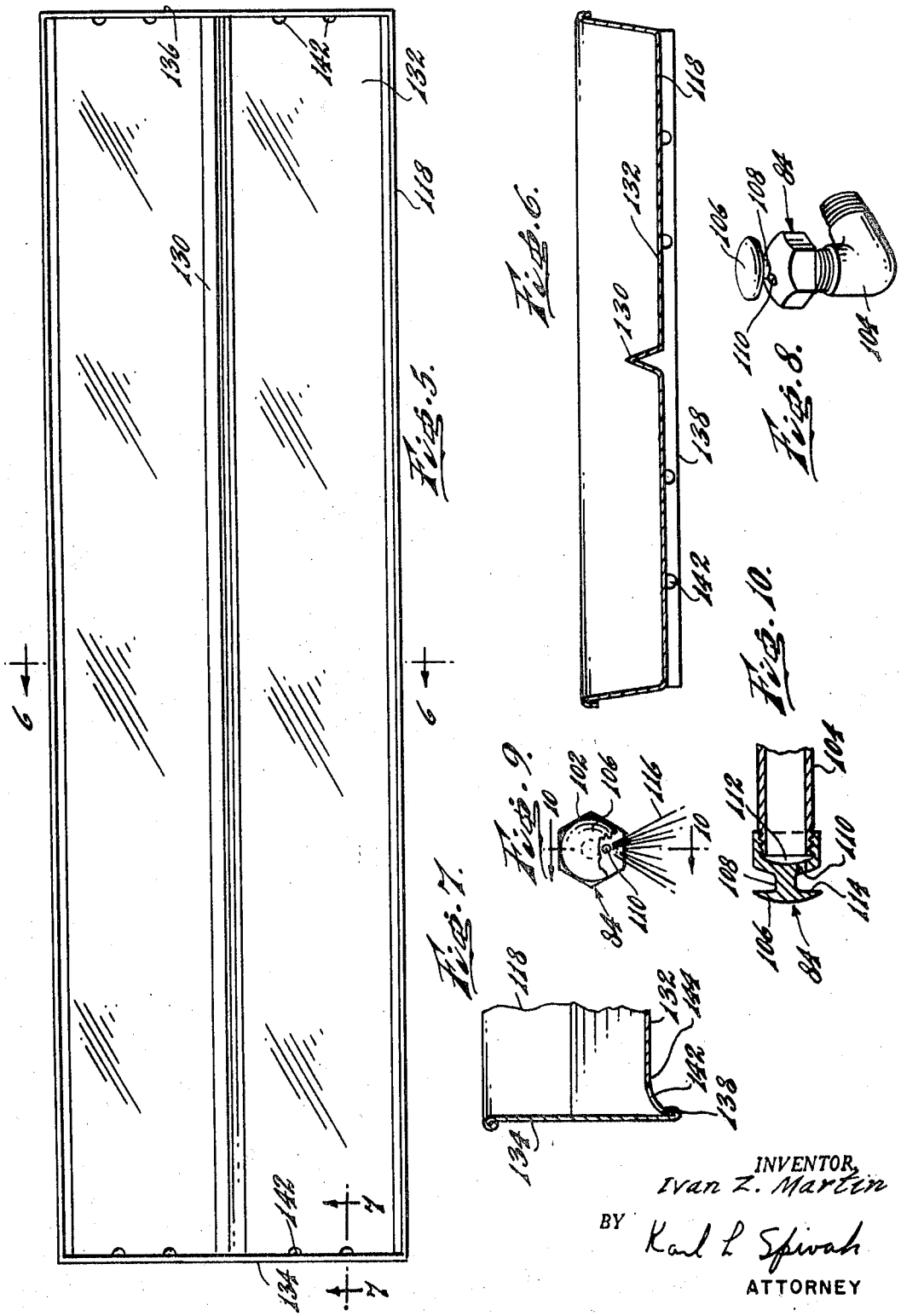

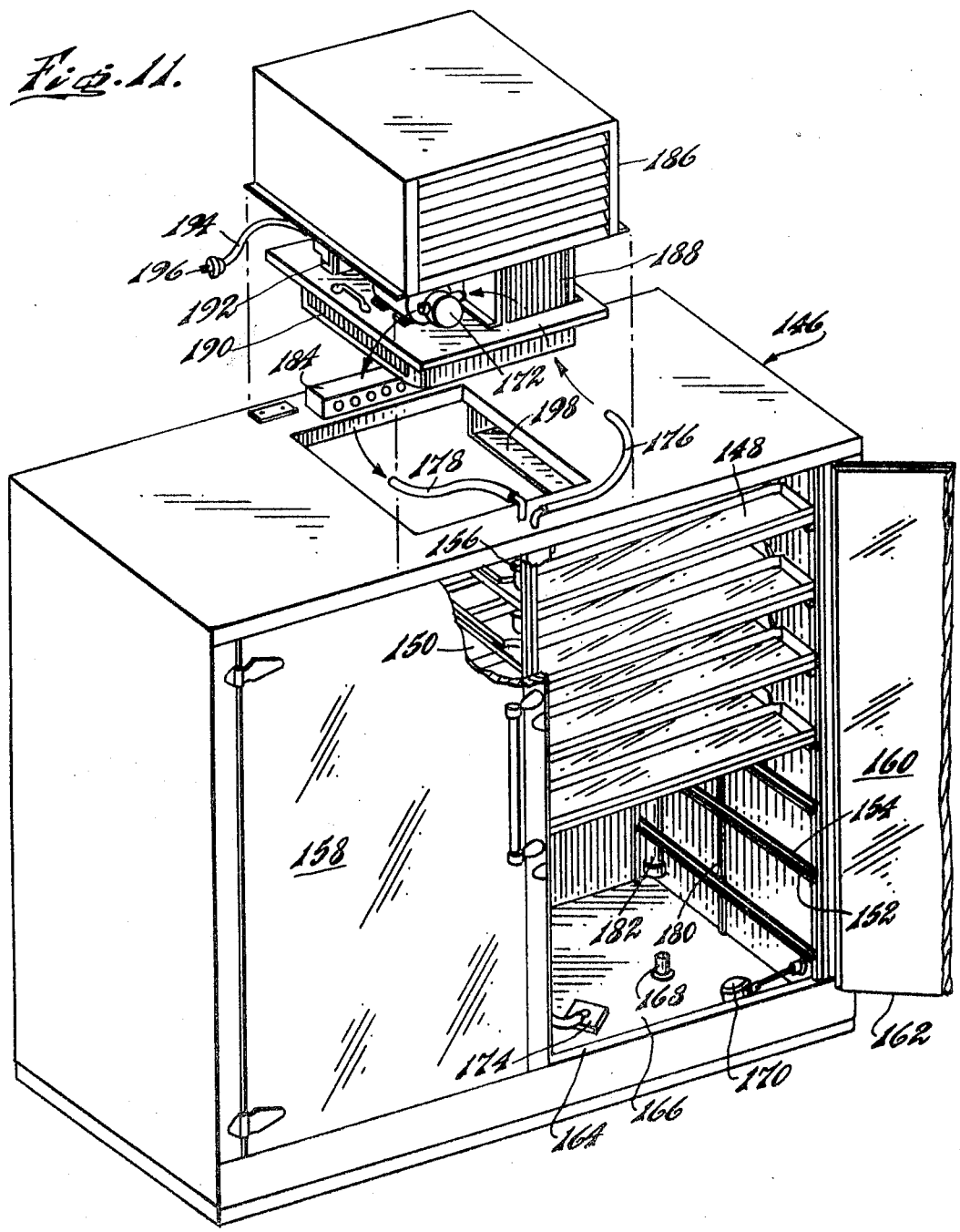

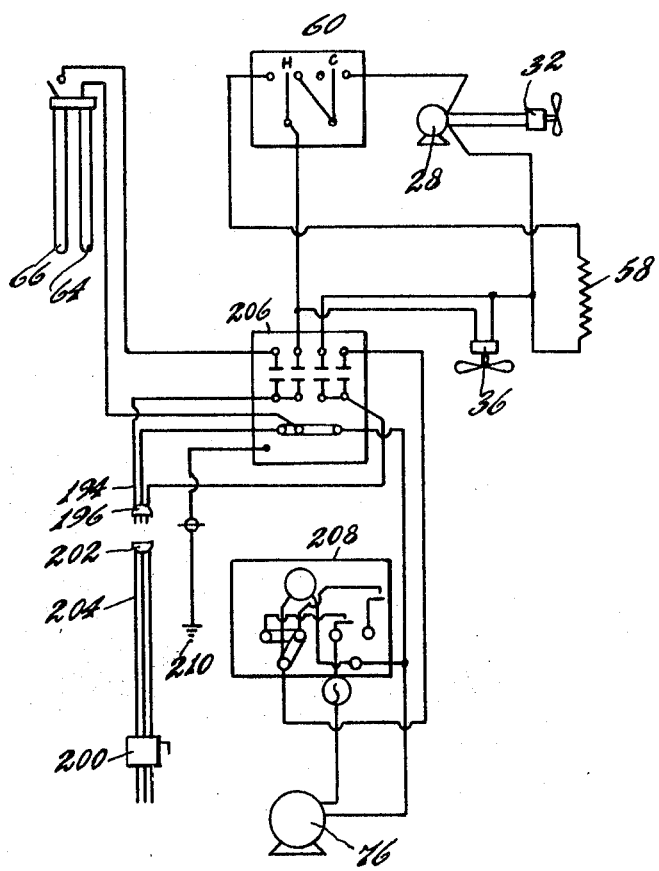

United States Patent Office 3,458,951
Patented Aug. 5, 1969

3,458,951
HYDROCULTURE GRASS UNIT
Ivan Z. Martin, R.D. 1, Lebanon, Pa. 17042
Filed Mar. 31, 1967, Ser. No. 630,785
Int. Cl. A01g 31/02; B05b 1/26
U.S. Cl. 47—1.2                         5 Claims

ABSTRACT OF THE DISCLOSURE

A self-contained, automatically controlled system and apparatus for growing grass without soil including a growing chamber in which temperature, humidity, light, ventilation and irrigation are carefully controlled to maintain optimum conditions for the rapid growth of fresh green grasses completely independent from changes in climate, weather or season of the year.

This invention relates in general to the soiless germination of seeds and the growth of grass (known as the science of hydroponics) and is more particularly directed to a method and apparatus that is completely self-contained in design and capable of growing approximately nine inches of grass from seed during a seven day repetitive growing cycle.

In addition to yielding natural grass, the apparatus produces grass which is uncontaminated by impurities, weeds and garlic. The effects of radio-active fallout are materially reduced in the grasses produced in the unit. By utilizing the instant system and apparatus, the continuous supply of nutritious grass provides supplemental feed for animals throughout the year. The entire growth is usable for supplemental diet for animals including the roots, kernal and blade.

The unit is designed for a normal seven day growing cycle. The growing chamber contains seven horizontally spaced shelves, one for each day of the week, and the entire chamber is maintained under carefully controlled conditions of temperature, humidity, light and air circulation. The temperature is maintained between sixty-five and sixty-eight degrees in the growing chamber during the entire year. Summer temperature control is obtained by refrigeration and winter temperature control by electrical heating elements. Air movement throughout the growing chamber is induced by a circulation blower and strategically placed air passages. Artificial light is provided in the growing chamber by fluorescent tubes, which act to produce green grass through the process of photosynthesis.

A unique irrigation system has been incorporated to assure adequate watering of the grasses. Irrigation is provided automatically at predetermined cycles of four to eight hours through spray nozzles which gently spray water from above to duplicate natural rain. Unique tray draining facilities function to drain the sprayed water back to an integral sump and thus prevent the formation of stagnant pools within the chamber to effectively eliminate the possibility of detrimental fungus growth.

Oats and barley seed are most commonly employed for economical considerations. However, any cereal grain may also be used with successful results. The maximum growth rate that may be anticipated when employing the instant system and apparatus is seven pounds of grass per pound of seed in seven days. At the end of seven days, the grass is normally between eight and ten inches high and the total daily production of grass varies from twenty-five to forty pounds, depending upon the amount of seed initially loaded into the tray.

It is an object of this invention to provide an improved hydroculture grass unit of the type set forth.

It is another object of this invention to provide a hydroculture grass system and apparatus capable of growing approximately nine inches of grass from seed in a seven day growing cycle.

It is another object of the instant invention to provide a hydroculture grass system and apparatus capable of operation completely independent from ambient temperatures and prevailing weather conditions.

It is another object of the instant invention to provide a method and apparatus for the hydroponic growth of grass that includes automatic rain simulating means.

It is another object of the instant invention to provide a method and apparatus for the hydroponic growth of grass including unique spray nozzles that incorporate complete wide-range spray means within a unitary structure.

It is another object of this invention to provide a hydroculture grass unit including seed carrying trays that are provided with efficient, optimumly positioned, drainage openings designed to assure complete tray drainage.

It is another object of this invention to provide a hydroculture grass unit and system including artificial illumination sources capable of providing the required energy to produce uniform green grass at the termination of a seven day growing cycle.

It is another object of the instant invention to provide a hydroculture grass unit incorporating automatic air circulatory and humidity regulating equipment to provide optimum growth conditions during repetitive seed growing cycles.

It is another object of the instant invention to provide a hydroculture grass unit that is automatic in operation, highly efficient in production and trouble-free in use.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 2 is a front elevational view thereof with the front door removed to expose the interior construction and arrangement of parts.

FIG. 3 is a cross-sectional view taken along line 3—3 of FIG. 2.

FIG. 4 is a cross-sectional view taken along line 4—4 of FIG. 2.

FIG. 5 is a top plan view of a tray utilized to hold seed for use with the instant invention.

FIG. 6 is a cross sectional view taken along line 6—6 of FIG. 5.

FIG. 7 is a cross-sectional view taken along line 7—7 of FIG. 5.

FIG. 8 is a perspective view of a spray nozzle.

FIG. 9 is a top plan view, partially broken away, of the nozzle of FIG. 8.

FIG. 10 is a cross-sectional view taken along line 10—10 of FIG. 9.

FIG. 11 is an exploded, perspective view, partially broken away to expose internal construction of a modified development of the instant invention.

FIG. 12 is a schematic wiring diagram of the controls and apparatus of the instant invention.

Figure 1:
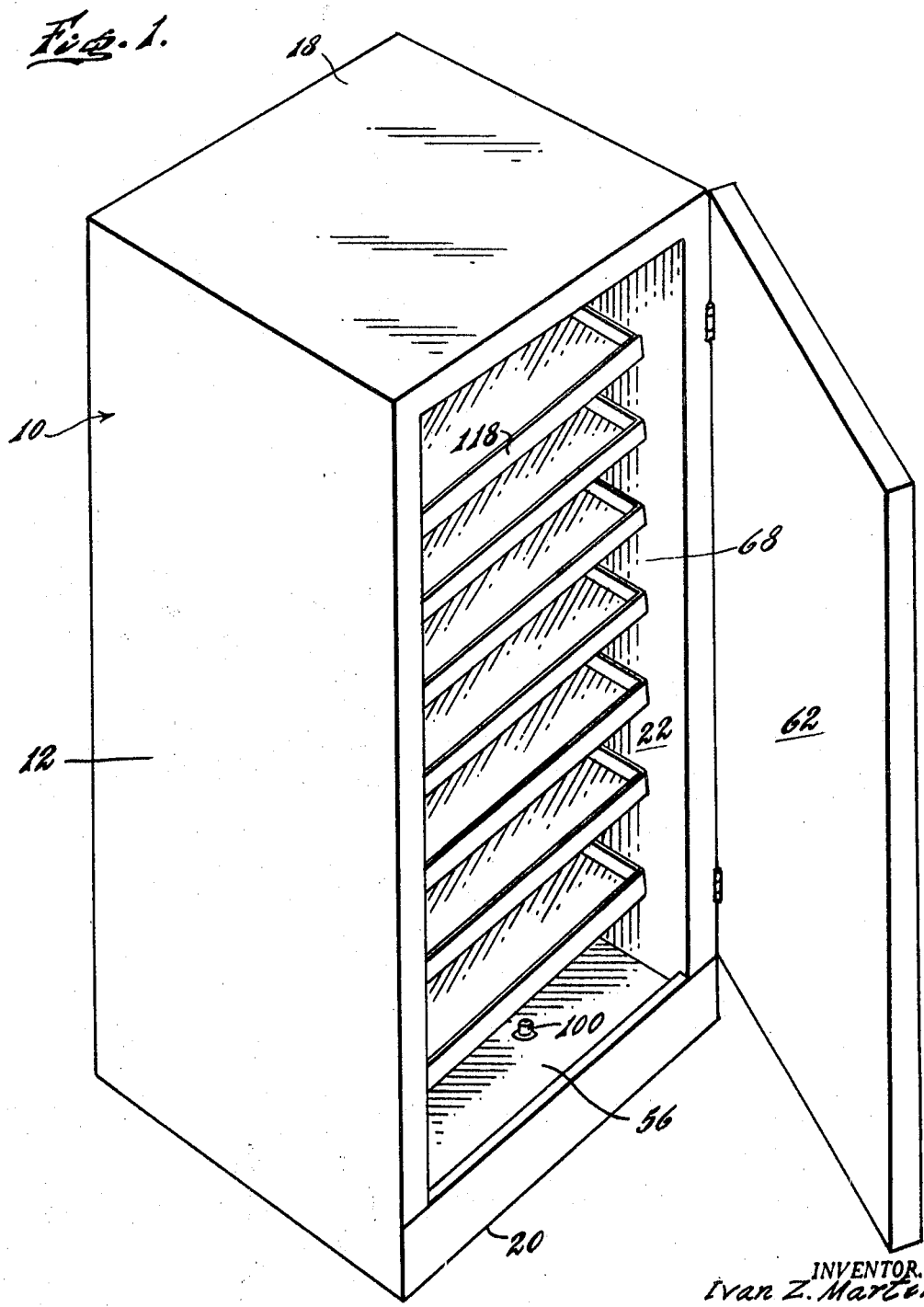
FIG. 1 is a perspective view of a hydroculture grass unit constructed in accordance with the instant invention.

Although specific terms are used in the following description for the sake of clarity, these terms are intended to refer only to the particular structure of my invention selected for illustration in the drawings and are not intended to define or limit the scope of the invention.

Referring now to the drawings, I show in FIGS. 1–4 a hydroculture grass unit, generally designated 10, comprising sidewalls 12, 14, a rearwall 16 and top 18. The entire unit rests upon a structural supporting base 20 that is integrally formed therewith to provide a sump or water reservoir as hereinafter more fully described. The shell of the unit is constructed of a rigid, waterproof, sheet material such as galvanized sheet steel or sheet aluminum of sufficient structural strength to render the entire unit self-supporting without additional exterior or interior strengthening members. An inner lining 22 of similar sheet material is formed parallel to the sides, back and top of the unit to provide a peripheral space 24 to receive an insulating material 26. Access is provided through a large, insulated front door 62 which is hinged for horizontal swinging to permit easy access to the interior of the unit for tray servicing purposes. Inasmuch as the unit is designed to be completely self-contained and operative under carefully controlled conditions despite variations in external temperatures, adequate insulation should be provided in the insulating space 24. A layer of approximately two inches of polyurethane foam insulation has been found suitable for this purpose. However, it should be noted that other insulating materials and different thicknesses of insulation may be employed and still fall within the scope and teachings of this invention.

In order to maintain year 'round temperature control to assure that internal temperatures remain in the range of approximately sixty-five to sixty-eight degrees for optimum growing conditions, both a refrigeration system and an electrical heating system have been incorporated. The refrigeration system comprises a compressor 28, a condenser 30, a condenser fan 32, and evaporator 34 and a circulating fan 36. As shown in FIGS. 3 and 4, the compressor 30 may be of the hermetically sealed type of flattened design commonly referred to as "pancake" compressors which are specially designed for use where space is limited. In the instant application, the narrow width of the compressor permits installation directly in the rearwall 16 of the unit to minimize space requirements. A rear sheet metal covering 38 encloses the compressor 28 and also provides a rear air passage 40 to direct air through the condenser 30. As can best be observed in FIG. 4, the insulation 26 in the rearwall 16 may be reduced at the compressor 28 as required to allow sufficient clearance for installation purposes.

A grille 42 introduces outside air to the suction of the condenser fan 32 for condenser cooling purposes. The condenser fan discharges directly into the rear air passage 40 and this discharge is directed to the condenser coil 30 and thence through the condenser discharge grille 44 which is shown at the top of the rear sheet metal wall 38. It can be readily appreciated that the condenser 30, condenser fan 32 and the intake and exhaust grilles 42, 44 may be elsewhere positioned on the rear wall 38 if obstructions or other design criteria so require.

Air from within the unit itself is pulled through the exhaust grille 46 by the suction of the circulating fan 36. The fan discharges downwardly through the air duct 48 which is defined between the rear liner inner lining 22 and the sheet metal duct wall 50. Upwardly inclined louvers 52 horizontally cross the face of the exhaust grille 46 to discourage blades of the growing grasses (not shown) from entering. The air induced by the fan 36 is forced downwardly through the duct 48 and discharges horizontally through the bottom exhaust slots 54 directly over the sump 56. The evaporator coils 34 of the refrigerator system and the electrical resistance heater element 58 of the heating system are positioned within the duct 48 in any well-known manner to assure that the air discharged by the circulating fan 36 impinges fully upon both the heating and cooling elements. Both the evaporator coils and the heater may be of conventional design of suitable configuration to fit within space provided. In this manner, uniform temperature conditions may be readily maintained at all times. A thermostat 60 is positioned within the enclosure and is wired into the operating circuit to provide either heat or cooling within the duct 48 as required to maintain the optimum operating conditions as hereinbefore stated. As seen in FIG. 4, the electrical heating element 58 extends down into the water 98 that is retained in the sump 56 so that the same element finds utility in heating both air and water.

A pair of vertical, fluorescent tubes 64, 66 furnish light in the growing chamber 68 for photosynthesis purposes to assure a full green growth at the termination of the growing period of seven days. Six foot long, sixty watt tubes have been found satisfactory to adequately illuminate each of the seed trays as they are suspended within the growing chamber 68. The tubes are conventionally socketed within the reflector 70 and are positioned to illuminate all areas of each seed tray. The reflector 70 is vertically disposed and is horizontally juxtaposed from the air duct 48. A glass or clear plastic cover 72 shields the tubes 64, 66 from the moisture within the growing chamber 68 and a gasketed connection between the cover 72 and the reflector 70 may be employed if desired or necessary. In the interest of neatness of design, I prefer to fabricate the reflector 70 to the same depth as the air duct 48. Also, a sheet metal panel 74 is employed in the same vertical plane as the duct wall 50 and the fluorescent tube cover 72 to provide a finished appearing rear wall to the growing chamber 68.

A water retaining sump 56 covers the bottom of the growing chamber 68 and receives the unused effluent from the sprinkler system as hereinafter more more fully discussed. A pump 76 draws its suction from the top 78 of a flat filter 80 that is positioned to rest upon the floor of the sump 56. The pump discharge feeds a sprinkler riser 82 that is vertically arranged within the air duct 48. Sprinkler nozzles 84, 86, 88, 90, 92, 94, 96 connect respectively to the riser 82 through the duct wall 50 and are positioned above each seed tray near the bottom of each next vertically positioned tray. In this manner, water 98 from the sump 56 can be uniformly pumped to each spray nozzle 84–96 for spraying each seed tray. The high position of each nozzle relative to each respective tray assures a uniform pattern of spray with no interference from the growing grasses. An overflow drain 100 of the standpipe type rises above the bottom of the sump and serves as a drain and also to skim off scum and other impurities that may be found floating on the surface of the water 98. The float valve 170 serves to feed make-up water to the sump to provide an excess amount of water for overflow and scum removal purposes.

Referring now to FIGS. 8–10, a novel spray nozzle 84 includes a hexagonal body 102 which is threaddedly engaged upon a branch water pipe 104 in a watertight connection. The branch pipe 104 connects to the sprinkler riser 82 to provide a water supply above each tray area. A discoid bonnet 106 is spaced above the body 102 by a short neck 108 and is concentric therewith. A small water passage 110 of approximately $\frac{1}{32}$-inch drill size, drilled parallel to the axis of the nozzle, communicates with the body chamber 112 outwardly from the neck 108 and allows water under pump pressure to flow from the branch 104 to strike the underside 114 of the bonnet 106. The bonnet underside 114 is milled or otherwise formed absolutely flat to act as a horizontal baffle and flat directional flow for the impinging water stream as it leaves the passage 110. The top of the bonnet tapers to the bottom edge 114 at the peripheral edges as best seen in FIG. 10. This construction serves to assure a non-varying spray pattern by discouraging sediment build-up about the periphery of the bonnet 106. The flat trajectory of the nozzle effluent 116 assures complete spraying over the entire tray of seed. As will be hereinafter pointed out, at the end of a seven day growing period, the trays are so spaced vertically that approximately two inches remains between the top of the grass and the bottom of the tray next above. It is therefore of utmost importance that the nozzle stream be directed almost perfectly horizontally to allow overall feeding. Also the size of the nozzle water passage 110 must be carefully controlled with respect to the diameter of the branch pipe 104 and the head pressure of the water pump 76 to assure adequate pressure both to properly break up the water stream into mist particles and to propel portions of the stream to the farthest reaches of all trays. A passage 110 that is too large will result in lost pressure and failure to break the stream into mist particles. A passage that is too small will result in insufficient water supply for feeding purposes. By so constructing the nozzle, I have found it possible to achieve a spray pattern of more than one hundred and eighty degrees, thereby assuring complete spray coverage.

As best illustrated in FIGS. 2 and 4, the trays 118 are arranged in seven tiers, one for each day of the week. The trays are vertically spaced at approximately ten-inch intervals to allow for a full seven day growth and also to provide space for the spray stream 116 over the top of the growing grasses during the feeding cycles. Each tray is supported upon a right and left angle support 120, 122, the right supports being arranged slightly higher respectively than the left supports to provide proper drainage of the feeding water from within the trays 118. Each support inclines slightly rearwardly to carry the tray drainage toward the rear of the growing chamber 68. The supports 120, 122 terminate rearwardly in downwardly depending lips 124 that act to facilitate flow into the sump 56 by gravity as individual droplets of water run together along the inclined supports 120, 122 to thereby combine to form larger, heavier water drops. The depending leg of the lip 124 serves to pull the drainage water from the supports 120, 122 and directs the water to drop into the sump.

As best seen in FIGS. 3, 4 the trays 118 are positioned within the chamber 68 in such a manner as to define an open space 126 at the front of the unit. This space serves as an air passage to assure uniform air circulation and uniform humidity conditions within the growing chamber. As previously stated, the exhaust from the circulating fan 36 is directed downwardly through the air duct 48 and is horizontally discharged through the exhaust slot 54 over the top of the sump water 98. In this manner, the air within the growing chamber is encouraged to approach its saturation humidity condition for the given temperature. Also, the air is directed towards the front of the chamber and thence upwardly through the open space 126 defined between the front of the trays 118 and the front door 62. Both the suction to the fan 36 and the pressure of the exhaust slot 54 discharge serve to assure uniform, overall, positive air circulation.

Each tray 118 is fabricated of sheet steel or aluminum of adequate strength to a rectangular configuration. The trays are constructed approximately three times as long as they are wide and are approximately one and one-half inches high. A stiffening rib 130 is bent along the longitudinal axis of the tray and the rib rises approximately five-eighths of an inch above the tray floor 132. The rib 130 strengthens the tray to assure rigidity when in use and also serves to divide the harvest into two equal portions for more convenient handling for feeding purposes. Further, the height of the rib finds utility as a guide to gauge the proper quantity of seed initially placed in the tray. Best growing and optimum yields can be achieved by filling the tray with seed up to a uniform height equal to the height of the rib 130.

As can be observed in FIGS. 6 and 7, the transverse tray ends 134, 136 depend below the level of the tray floor 132 and provide a pair of spaced edges 138, 140 which are designed to rest upon the supports 120, 122 in line contact to facilitate drainage and to minimize damp spaces. In such a manner, the formation of plant damaging mold and the development of fungus growths may be discouraged. A plurality of drainage holes 142 penetrate the tray floor 132 near the transverse ends 134, 136. Referring to FIG. 7, it will be observed that each hole 142 is drilled or otherwise punched on the downwardly sloping portion 144 of the tray bottom which is downwardly formed to provide the depending edge 138. By so locating the drainage holes 142, complete drainage of the tray upon the termination of the spray cycle can be assured. As previously stated, the supports 120, 122 are so positioned that each tray will drain towards support 120. The spray water will normally drain through the holes 142 and thence to the sump 56. However, on prior art models, complete draining was not effected merely by drainage openings and wet spots remained, all to the detriment of the growth. In the instant case, by forming the openings 142 on a downwardly sloping surface 144, water will initially drain until the tray is almost dry. The depending angle of the holes then initiates a gravity attraction drainage action causing complete and absolute drainage of the tray. In this manner the presence of damp spots can be completely eliminated from the trays.

In FIG. 11, I show a modified type of hydroculture grass unit 146 wherein a double stack of horizontally juxtaposed trays 148, 150 rest upon inclined supports 152 in the usual manner. Plastic rack liners 154 covering the metal contact portions of the supports 152 may be advantageously employed to facilitate drainage. The trays incline towards the center for ease in draining and to provide uniformly sloping growing surfaces to receive the effluent from the sprinkler heads 156. A pair of horizontally swinging doors 158, 160 provide ready access to the trays 148, 150. Peripheral rubber door gaskets 162 seal against the lip 164 for a watertight door connection. A float valve 170 controls the water level in the sump 166 and the overflow 168 serves to draw off scum and floating impurities to the drain (not shown). A pump 172 draws water through a filtered pickup 174 through suction tubing 176 and feeds the sprinklers 156 through the discharge tubing 178. Optionally, the tray support 180 could be utilized also as the suction tubing by simply constructing the support as a conduit and by connecting it into the water system. Fluorescent tubes 182 vertically mount in the corners to expose all trays to the light rays and the light ballasts 184 may be mounted within the equipment housing 186 for installation in a moisture reduced environment. The equipment housing further encloses the condenser coil 188, the evaporator coil 190, a timer 208, an on-off switch 192, the power cord 194 and plug 196. A blower unit (not shown) extends down through an opening in the top of the cabinet. This blower communicates with a set of horizontal ducts 198 mounted to the roof of the interior of the cabinet. These ducts feed the temperature controlled air down over the seven equally spaced rows of seed trays.

The basic electrical circuitry of the device can be observed in FIG. 11 wherein 220 volt single phase, sixty cycle alternating current is fed through a fused disconnect switch 200 to a female receptacle 202 through a three wire cord 204. An equipment circuit breaker panel 206 connects to the receptacle 202 through a plug 196 and flexible electrical cord 194. Circuits controlling the fluorescent tubes 64, 66, the compressor 28 and condenser fan 32, the electrical heating element 58, the water pump 76 and the circulating fan 36 originate at the circuit breaker panel 206. A thermostat 60 optionally controls the operation of the heater 58 and the compressor 28. A clock timer 208 functions to control the cyclical operations of the pump 76.

In order to use the device, locate the unit indoors in a position to allow ease of operation in an area where summer temperatures will not exceed ninety degrees and winter temperatures will not drop below freezing. A water connection to the float valve 170 should be made and the overflow should be piped to a drainage system. The required electrical connections should be installed with care being taken to provide a good ground connection 210. Plant food should then be added to the sump water as an aid to healthy plant growth. Next place from four to seven pounds of clean seed in each tray on the bottom shelf. On the next day seed the second shelf, and so on until all the trays are seeded. On the eighth day, the two trays on the bottom shelf should be harvested and the trays reseeded. Once every day the tallest growth is removed from the growing chamber for feeding to the livestock. Before reseeding the trays, they should be checked and cleaned and all drain holes opened. The time clock 208 is normally set to provide six irrigations per day, each of fifteen minute duration. As a general rule, the more pounds of seed placed in each tray, the longer period of irrigation will be required each four hour cycle. Too much water will cause water logging at the lower end of the tray. Insufficient irrigation can be detected by poor growth and dry spots. The float valve 170 serves to remove scum and foam on the top of the water after each irrigation to avoid mold and filthy conditions within the cabinet.

Although I have described my invention with a certain degree of particularity, it is understood that the present disclosure has been made only by way of example and that numerous changes in the details of construction and the combination and arrangement of parts may be resorted to without departing from the spirit and scope of the invention as hereafter claimed.

What is claimed is:

1. In a hydroculture grass unit containing walls and an access door, the combination of
   (A) a housing,
      (1) said housing defining an interior chamber therein;
   (B) a plurality of seed holding trays arranged within the said chamber,
      (1) said trays being vertically spaced to define grass growing areas therebetween,
      (2) said trays respectively inclining to one side for drainage purposes,
      (3) said trays declining rearwardly for drainage purposes, and
      (4) said trays being provided with a floor and a pair of laterally spaced ends,
         (a) the said ends depending below the level of the said tray floor,
         (b) the said depending portions of the lateral tray ends being provided with a plurality of drainage openings,
            (1) the said openings being positioned below the said tray floor;
   (C) means for humidifying and dehumidifying the air within the said chamber;
   (D) air movement means provided within the said chamber,
      (1) said means defining a rear circulating path and a forward circulating path,
         (a) the said rear circulating path being fabricated within the construction of the said housing,
         (b) the said forward circulating path being defined between the front of the said trays and the said access door;
   (E) water spraying means conveying water simultaneously to each of the said trays,
      (1) said means including a pump, piping and sprinkler heads,
         (a) said sprinkler heads including means for imparting substantially horizontal trajectory to the water effluent therefrom;
   (F) illumination means provided within the said chamber,
      (1) said means directing light rays equally upon all of the said trays,
   (G) tray support means interiorly affixed to the said housing,
      (1) said tray support means declining slightly rearwardly,
         (a) said tray support means having portions thereof in contact with the said depending ends of the said trays,
         (b) said tray support means attracting droplets of water from the said water spraying means as the said droplets drain through the said tray drainage openings,
      (2) the said tray support means terminating rearwardly in downwardly depending lips,
         (a) the said lips drawing water from the tray contacting portion of the said tray support means to direct the water downwardly within the said chamber;
   (H) periodic time means controlling the operation of the said water spraying means in a plurality of spaced, timed, cyclical operating periods.

2. The invention of claim 1 wherein a water receiving sump positions at the bottom of the said chamber and wherein a portion of the said air movement means is directed across the surface of the said sump.

3. The invention of claim 1 wherein the said depending laterally spaced ends of the said trays are joined to the said tray bottoms in downwardly sloping portions of the said tray bottoms and wherein the said drainage openings are positioned on the said downwardly sloping portions.

4. The invention of claim 1 wherein the said depending laterally spaced ends of the said trays are joined to the said tray bottoms in downwardly sloping portions of the said tray bottoms wherein the said drainage openings are positioned on the said downwardly sloping portions, and wherein the said drainage openings are angularly disposed with respect to the said floor, the said angular disposition of the holes initiating a gravity attraction drainage action of water from the bottoms of the said trays.

5. The invention of claim 1 wherein each said sprinkler head is provided with a body chamber, and a discoid bonnet spaced above the body chamber by a short concentric neck, the said body being vertically drilled to provide a small water passage opening, the said opening communicating at one end thereof with the said body chamber, the said water passage being drilled parallel to the axis of the said body, and the said water passage terminating at the other end thereof in an opening positioned to direct water along the said neck to the underside of the said bonnet, the said underside of the bonnet being formed absolutely flat to act as a horizontal baffle to direct water horizontally over the tops of the said trays.

References Cited

UNITED STATES PATENTS

| | | | |
|---|---|---|---|
| 1,863,914 | 6/1932 | Tyler | 239—524 |
| 2,051,094 | 8/1936 | Loughridge | 47—1.2 |
| 2,896,374 | 7/1959 | Perin | 47—1.2 |
| 2,897,631 | 8/1959 | Howsley et al. | 47—1.2 |
| 2,917,867 | 12/1959 | Bailey | 47—1.2 |
| 2,928,211 | 3/1960 | Martin | 47—1.2 |
| 3,101,176 | 8/1963 | Goss | 239—524 |

ROBERT E. BAGWILL, Primary Examiner

U.S. Cl. X.R.

239—524